No. 621,551. Patented Mar. 21, 1899.
J. WÖRZ.
VENTILATING APPARATUS FOR HOUSES.
(Application filed May 12, 1898.)
(No Model.) 2 Sheets—Sheet 1.

Witnesses:
N. Mitchell
A. Gloetzner

Inventor:
Joseph Wörz
by Max Ingau
Attorney

No. 621,551. Patented Mar. 21, 1899.
J. WÖRZ.
VENTILATING APPARATUS FOR HOUSES.
(Application filed May 12, 1898.)
(No Model.) 2 Sheets—Sheet 2.
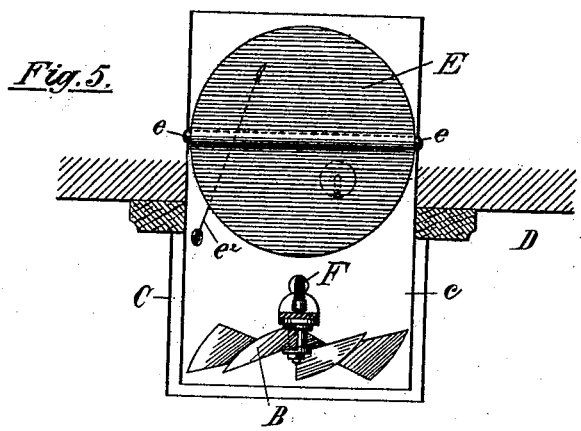
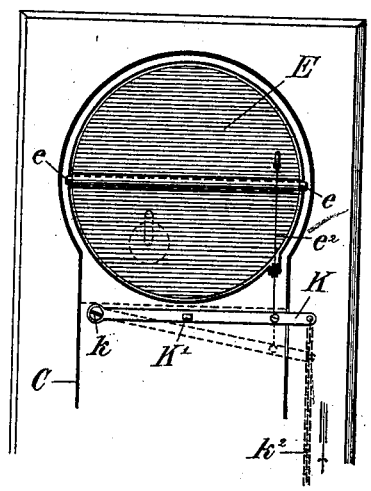
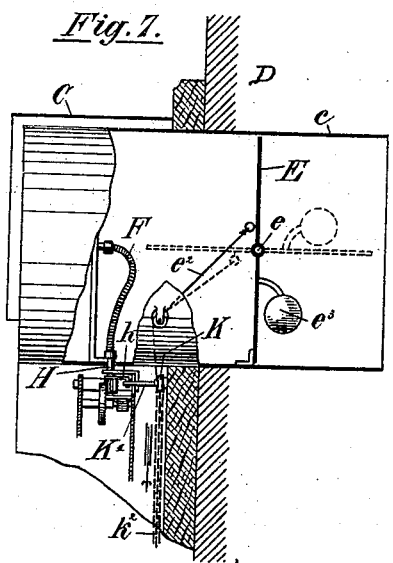
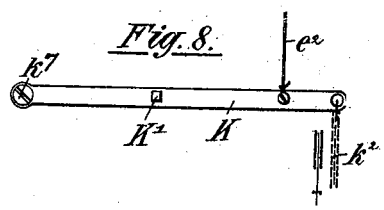
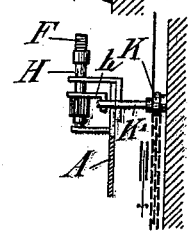
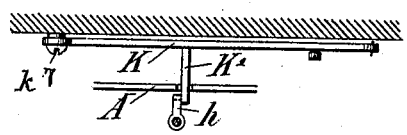
Witnesses:
N. Mitchell
A. Gloetzner.
Inventor:
Joseph Wörz
by
Attorney.
THE NORRIS PETERS CO., PHOTO-LITHO., WASHINGTON, D. C.

UNITED STATES PATENT OFFICE.

JOSEPH WÖRZ, OF ULM, GERMANY.

VENTILATING APPARATUS FOR HOUSES.

SPECIFICATION forming part of Letters Patent No. 621,551, dated March 21, 1899.

Application filed May 12, 1898. Serial No. 680,459. (No model.)

*To all whom it may concern:*

Be it known that I, JOSEPH WÖRZ, manufacturer, a citizen of the Kingdom of Würtemberg, residing at Ulm, Germany, have invented a certain new and useful Improvement in Ventilating Apparatus; and I do hereby declare the following to be a full, clear, and exact description of the invention, such as will enable others skilled in the art to which it appertains to make and use the same.

This invention has for its object a ventilating apparatus, which is shown in the accompanying drawings, in which—

Figure 1:
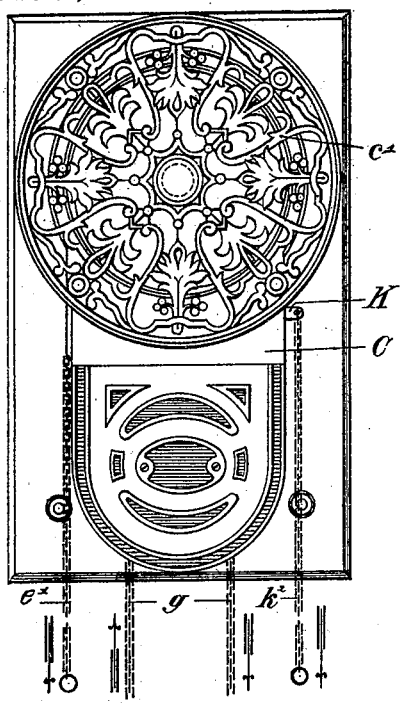
Figure 2:
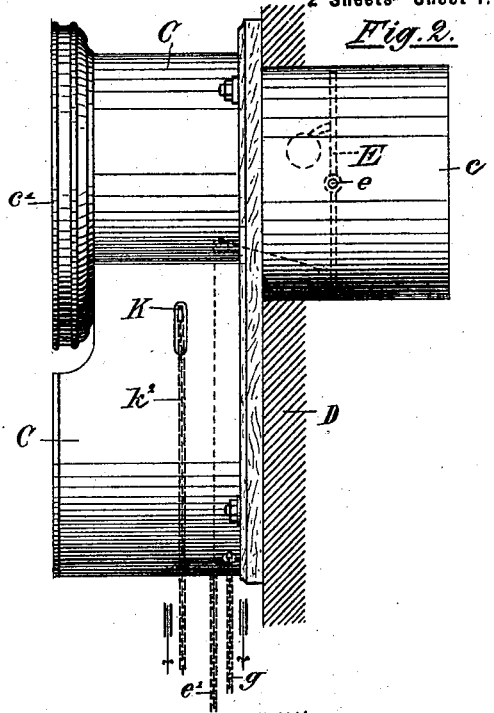

Figure 1 is a front elevation; Fig. 2, a side elevation, and Fig. 3 a front elevation with the case or cover removed; Fig. 4, a vertical section on the line $x\,x$ of Fig. 3, and Fig. 5 a horizontal section on the line $y\,y$ of Fig. 3. Figs. 6 and 7 are respectively a cross-section and side view, in partial longitudinal section, of a modified form of the arrangement, while Figs. 8, 9, and 10 are details.

Figure 3:
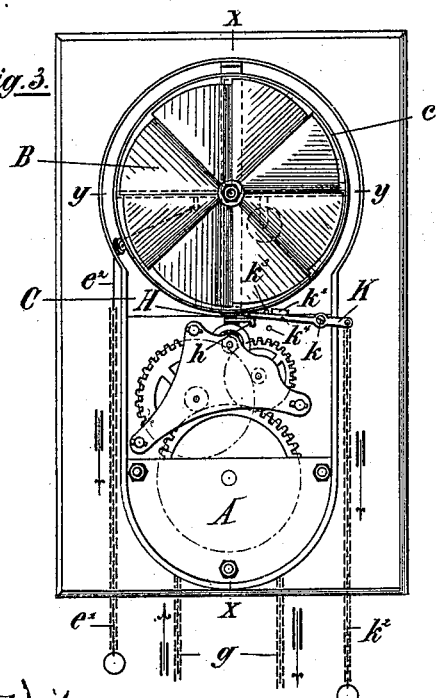
Figure 4:
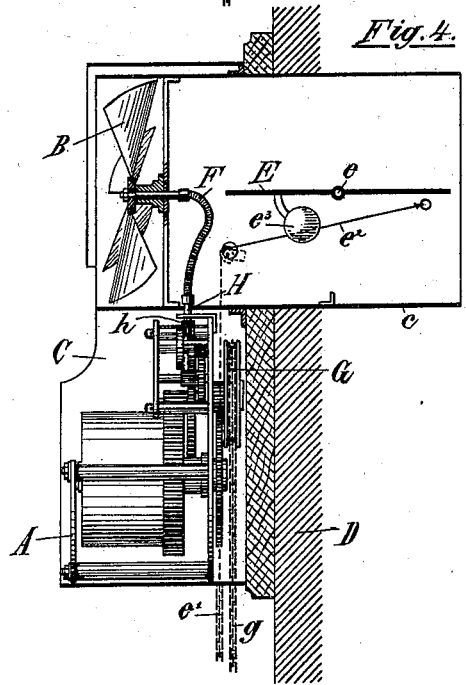

This apparatus consists of a combination of a clockwork mechanism A, Fig. 3, with a fan-ventilator B and is mainly intended for use in restaurants, dwelling-houses, and the like. The clockwork A and the fan or ventilator B are contained in a common casing C, from which the ventilator-pipe $c$ branches off at right angles in order to be passed through the wall D of the room to extend into the open air or else be carried into a ventilating-shaft. The case or cover C or the front wall of the same is open in front at $c'$ at the level of the ventilating-pipe $c$ or is perforated in a suitable pattern, so that the ventilator B can draw air through these openings or perforations $c'$ from the chamber to be ventilated and expel it through the pipe $c$.

The ventilating-pipe $c$ is capable of being closed by means of a flap or damper E, pivoted on a spindle $e$, and this is effected by pulling a chain $e'$ in the direction indicated by the arrows in Figs. 1, 2, and 3, said chain forming the continuation of a cord $e^2$, Figs. 4 and 5, attached to the flap E. A counterweight $e^3$ is also attached to the flap E in such a way that the flap E automatically opens as soon as the chain $e'$ is released.

The operation of the ventilator from the clockwork mechanism takes place, preferably, by means of a coiled spring F. This coiled spring in fact plays the part of a compensator, as it alternately expands and contracts on sudden slackenings or accelerations of the going of the clockwork A, so that the ventilator always has a constant average speed of rotation independent of the various speeds of going of the clockwork. In place of such a spiral spring any of the so-called "flexible" shafts of any suitable form of construction, or a toothed gearing, belt-gearing, or the like, may be employed.

The winding up of the clockwork is effected by means of an endless chain $g$, which travels over a chain-wheel G, or by means of an endless band, cord, or the like, which is moved in the direction indicated by the arrow in Figs. 1 and 3 to turn the wheel G.

In order to enable the ventilator B to be stopped at any suitable time, the driving-shaft H of the clockwork A, connected with the shaft F, is provided with an arm $h$, Fig. 3, while a lever K, weighted with a counterweight $k'$ and operated by means of a chain $k^2$, is provided in the casing C, the said lever K being pivoted on a spindle $k$. The arrangement is such that in the position of repose the lever K rests under the action of the weight $k'$ on a pin $k^4$, and thereby projects into the track of the arm $h$, rotating with the shaft H, and therefore the arm $h$ encounters the free end of the lever K, and the clockwork and therewith the ventilator B are brought to a standstill. If it be desired to start the apparatus, the chain $k^2$ is drawn downward in the direction of the arrow in Fig. 3 until the lever K encounters the pin $k^3$. When this takes place, the lever K releases the arm $h$, and thus the shaft H, and thereby the clockwork A, can again run freely and drive the ventilator. The arrangement may also be such that the valve E and the lever K may be operated by a common chain $k^2$. Such an arrangement is shown in Figs. 6 and 7 in sectional front and side elevations, which show the parts of the apparatus necessary for understanding the form of construction of the device, and also in Figs. 8 to 10, which are front, plan, and side views, respectively, of the details on an enlarged scale. In this case the lever K, which starts the apparatus, is formed as a one-armed lever pivoted on a spindle $k^7$, on which lever a draw-cord $e^2$, connected with the flap E, is so attached that the lever is usually maintained in a raised position under the action of the weight $e^3$ of the flap E, in which position the arm K', Figs. 7 to 10, mounted on it, projects into the track of the arm $h$ of the shaft H, stopping the latter, and thus arresting the clockwork. If, on the other hand, the cord $k^2$ be drawn downward, the lever K swings, with its arm K', out of the way of the arm $h$ of the shaft H, and the clockwork begins to go.

Having now particularly described and ascertained the nature of my said invention and in what manner the same is to be performed, I declare that what I claim is—

1. In ventilating apparatus, the combination with a suitable motor, of a fan, a driving connection between the said fan and the motor-shaft, a casing for the fan provided with a damper, means for stopping and starting the motor, and connections between said means and the damper, whereby the two are simultaneously operated, as described.

2. In ventilating apparatus, the combination with a suitable motor, of a fan, a flexible driving connection between the said fan and the motor-shaft, a casing for the fan provided with a damper, means for stopping and starting the motor, and connections between said means and the damper, whereby the two are simultaneously operated, as described.

3. In ventilating apparatus, the combination with a clockwork-motor, of a fan, a flexible driving connection between the said fan and the motor-shaft, a casing for the fan provided with a damper, means for stopping and starting the motor, and connections between said means and the damper, whereby the two are simultaneously operated, as described.

4. In ventilating apparatus, the combination with a suitable motor, of a fan, a driving connection between the fan and the motor-shaft, a casing for the fan provided with a damper, a pivoted lever having an arm engaging and disengaging an arm on the motor-shaft, and an operating-cord for said arm also connecting with the damper, as described.

In testimony whereof I have affixed my signature in presence of two witnesses.

JOSEPH WÖRZ.

Witnesses:
AUGUST DRAUTZ,
JULIUS RUISSINGER.